July 8, 1958  B. J. PORZONDEK  2,842,190
VEHICLE SEAT CUSHION
Filed July 16, 1956

B. J. PORZONDEK
INVENTOR.

BY E. C. McRae
J. R. Faulkner
D. H. Oster
ATTORNEYS

United States Patent Office 2,842,190
Patented July 8, 1958

2,842,190

VEHICLE SEAT CUSHION

Bernard J. Porzondek, Belleville, Mich., assignor to Ford Motor Company, Dearborn, Mich., a corporation of Delaware Application July 16, 1956, Serial No. 598,124

9 Claims. (Cl. 155—184)

This invention relates generally to seat cushions, and more particularly to seat cushions for motor vehicles.

Frequently motor vehicle seat cushions and seat back cushions are trimmed with two or more different upholstery materials, with the materials being separated by means of a depressed seam or by means of a heading or welt to provide a pleasing line of demarcation between the different materials. For example, the seat back cushion may have an upper bolster of leather or a vinyl plastic, while the remainder of the cushion may be trimmed with a suitable fabric. It has been customary to draw the seam inwardly of the cushion and to secure it to the seat structure by means of a bolster wire or other suitable means. These attachments are always difficult to make and with certain types of upholstering methods are virtually impossible. It is therefore an object of the present invention to provide a seat cushion structure in which a seam or heading between different portions of the cover material may be drawn inwardly of the cushion to provide a bolster effect without the necessity of providing attachments to the seat spring or frame structure. This is accomplished in an embodiment of the invention by providing a spring steel band at the seam with the spring steel band being preformed so as to have an inwardly bowed free position. When assembled with the seat structure, the inwardly bowed spring steel band is straightened by engagement with the various seat spring units. The spring steel band is thus constantly under load and maintains a taut seam between the adjacent portions of the upholstering of the seat cushion. Thus, not only is a saving effected in the labor ordinarily required in trimming a seat cushion of the bolster type, but a neat trim appearance is effected which is maintained throughout the life of the seat cushion.

Other objects and advantages of this invention will be made more apparent as this description proceeds, particularly when considered in connection with the accompanying drawings, wherein.

Figure 1:
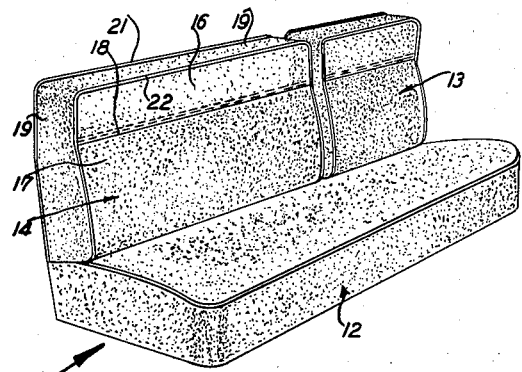
Figure 1 is a perspective view of the front seat of a motor vehicle incorporating the present invention.

Although in the drawings a vehicle seat back cushion is illustrated, the term seat cushion will be utilized in the specification and claims to designate either a seat back cushion or a seat cushion, since the present invention is applicable to either.

Referring now to the drawings, there is shown in Figure 1 a front seat 11 for a motor vehicle having a one-piece seat cushion 12 and a divided seat back formed of a narrow seat back cushion 13 for the driver of the vehicle and a wider seat back 14 for the front seat passengers.

Except for changes necessary to accommodate the difference in width, the seat back cushions 13 and 14 are similar, and therefore only the structure of the seat back cushion 14 will be described in detail.

Figure 2:
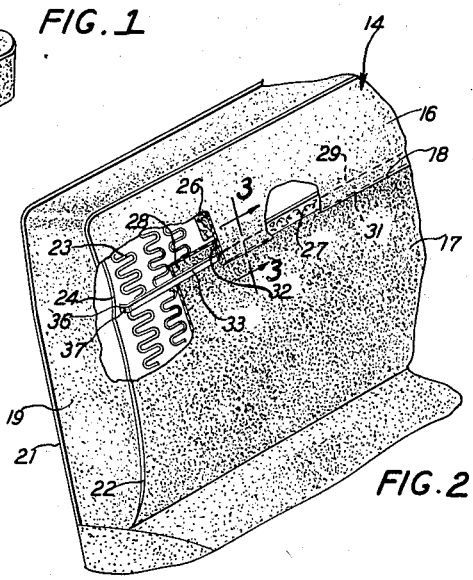
Figure 2 is an enlarged perspective view of a portion of Figure 1, partly broken away and in section.

Referring to Figures 1 and 2, the seat back cushion 14 has an upper front cover 16 forming a bolster and a lower front cover 17 separated from the upper front cover by a deck seam 18. A facing 19 extends across the top and sides of the heat cushion, and trim welts 21 and 22 are provided adjacent the edges thereof.

As best seen in Figure 2, the seat back cushion 14 includes a plurality of generally vertically extending laterally spaced wire spring units 23. The spring units 23 comprise sinuously corrugated wire springs each having spaced straight bar portions extending laterally of the seat cushion and interconnected at their ends by looped portions to provide an integral one-piece spring unit of corrugated shape. The individual wire springs 23 are attached at their ends to the seat frame (not shown) and are properly curved to resiliently support the load impressed upon the cushion by the occupants. A border wire 24 extends around the periphery of the spring structure and may also be secured to the spring units 23.

The wire springs 23 are covered with a layer of cotton padding 26 and with the upholstery materials of the upper and lower front covers 16 and 17. The front covers 16 and 17 may simply be different fabrics, or one or both may be leather or a vinyl plastic or other suitable upholstery material. Often the upper front cover 16 is formed of vinyl or leather to form a protected bolster.

Figure 3:
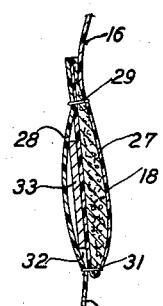
Figure 3 is an enlarged cross sectional view taken on the line 3—3 of Figure 2.

As best seen in Figures 2 and 3, the lower portion of the upper front cover 16 is turned under to form the deck seam 18, and a fibrous filler 27 is enclosed between the layers thereof. The folded deck seam 18 at the lower edge of the upper front cover 16 overlaps the upper marginal portion 28 of the lower front cover 17, and parallel lines of stitching 29 and 31 secure the two covers together.

The deck seam construction described above provides a pocket 32 between the overlapping portions of the upper and lower front covers 16 and 17 between the parallel lines of stitching 29 and 31. This pocket accommodates a spring steel band 33.

Figure 4:
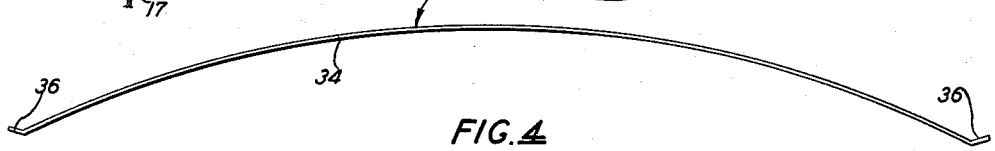
Figure 4 is an edge view of the spring steel band incorporated in the structures of Figures 1 to 3 inclusive.

Referring now to Figure 4, it will be seen that the spring steel band 33 is in the form of a flat metal strip having a central body portion 34 and terminal end flanges 36 at each end thereof. In the free position of the band 33 the central body portion 34 thereof is bowed as shown in Figure 4. The bowed portion may be in the form of a true arc having a relatively large radius or it may be of any other desired shape to accomplish the purpose intended. The terminal end portions 36 of the band are bent slightly with respect to the bowed central portion.

The spring steel band 33 is inserted in the pocket 32 between the adjacent overlapping portions of the upper and lower front covers, and in the present instance extends substantially the entire width of the seat back cushion 14. The band is inserted in the pocket with the bowed central portion 34 thereof facing the interior of the seat cushion, and it will be seen that the rearwardly bent terminal end portions 36 of the band protect the upholstery material and prevent the ends of the band from piercing or otherwise injuring the material.

It will be apparent that the inwardly bowed spring steel band acts, through the cotton padding 26, against the wire spring units 23 which force the band into a straightened position. The curvature or shape of the central bowed portion 34 of the spring steel band is predetermined in conjunction with the particular seat spring arrangement for interaction therewith to provide a transversely extending straight band constantly under load, The tensioned band maintains the deck seam 18 between the upper and lower front covers 16 and 17 in a taut condition and suitably depressed to provide the desired trim appearance.

It will be seen that installation is simple since the band need only be inserted in the pocket at a suitable time during the trimming of the seat cushion, and since no attachments are necessary between the band and any portion of the seat spring or seat frame structure. While it has been found that satisfactory results may be obtained by simply inserting the band in the pocket of the upholstery material without attaching the band either to the upholstery material or to any portion of the seat structure, it is within the contemplation of the invention to attach the end portions of the band to a part of the spring structure. For example, the terminal end portions 36 of the band may be formed with openings 37 and hog rings may be used to attach the latter to the border wire 24 of the seat structure.

Figure 5:
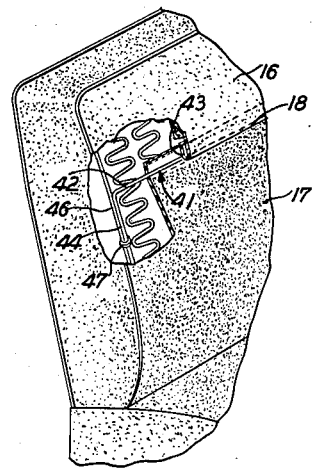
Figure 5 is a perspective view similar to Figure 2 but illustrating a modification.

In the modification of the invention shown in Figures 1 to 4 inclusive, the spring steel band is a flat piece of material and consequently may be held in its pocket properly oriented so that the bowed portion thereof is directed inwardly of the cushion. It is also possible, however, to utilize a spring steel wire in place of a band, and this modification is shown in Figure 5. In this instance the wire 41 is formed with a generally transversely extending central portion 42 rearwardly bowed and insertable into a pocket 43 formed between the upper and lower front covers 16 and 17. To properly orient the central portion 42 of the spring steel wire 41, the latter is formed with bent end portions 44 arranged to lie adjacent the border wire 46 and to be attached thereto by hog rings 47. Since the central portion 42 of the wire 41 is retained within the upholstery pocket, only a single hog ring is necessary to prevent the central portion from turning, although additional rings may be used if desired. Because of the end portions 44 the spring steel wire 41 must be assembled in the pocket before the stitching is completed.

It will be understood that the invention is not to be limited to the exact construction shown and described, but that various changes and modifications may be made without departing from the spirit and scope of the invention, as defined in the appended claims.

What is claimed is:

1. In a vehicle seat cushion, a frame, spring units supported by said frame, resilient padding overlying said spring units, upholstery material overlying said padding, and an elongated flexible element extending across a portion of said cushion and engaging said upholstery material to form a division between portions of said upholstery material on opposite sides thereof, said element in its free position being bowed toward said seat cushion.

2. The structure defined by claim 1 which is further characterized in that said elongated flexible element comprises a flat spring steel band adapted to be deformed from its free bowed position to a substantially straight position by the interaction between said spring steel band and said spring units.

3. In a vehicle seat cushion, a frame, spring units supported by said frame, resilient padding overlying said spring units, a pair of upholstery covers overlying adjacent portions of said padding, said covers having overlapping portions forming an elongated pocket therebetween, and an elongated resilient member extending through said pocket, said member in its free position being bent toward said spring units.

4. The structure defined by claim 3 which is further characterized in that said resilient member comprises a spring steel wire having an intermediate bowed portion and integral bent end portions, and means securing said bent end portions of said wire to said seat frame.

5. In a vehicle seat cushion, a plurality of generally parallel transversely spaced corrugated wire springs, resilient padding overlying said corrugated wire springs, upholstery material overlying said padding, and an elongated flexible element extending transversely of said seat cushion and overlying a plurality of said corrugated wire springs, said flexible element being deformed and engaging said upholstery material to urge the latter toward said corrugated wire springs.

6. The structure defined by claim 5 which is further characterized in that said upholstery material is formed with a transversely extending elongated pocket therein crossing a plurality of said corrugated wire springs, said flexible element being located in said pocket.

7. The structure defined by claim 6 which is further characterized in said flexible element comprises a flat initially bowed spring steel strip retained within said pocket and reacting yieldably against said corrugated wire springs to hold the portions of said upholstery material adjacent said pocket in position.

8. In a vehicle seat cushion, a frame, spring units supported by said frame, upholstery material overlying said spring units, and an elongated flexible element extending across a portion of said cushion and acting upon said upholstery material to form a line of demarcation between portions of said upholstery material on opposite sides thereof, said element in its free position being bowed toward said seat cushion.

9. The structure defined by claim 8 which is further characterized in that the terminal ends of said elongated flexible element are secured to spaced portions of said seat cushion, said element being adapted to be deformed from its free bowed position to a substantially straight position by the interaction between said element and said spring units.

References Cited in the file of this patent

UNITED STATES PATENTS 2,781,084  Laitur _____ Feb. 12, 1957